(12) United States Patent
Saeed et al.

(10) Patent No.: US 10,977,184 B2
(45) Date of Patent: Apr. 13, 2021

(54) MANAGING MEMORY ACCESS FOR CONVOLUTIONAL NEURAL NETWORKS

(71) Applicants: Apical Limited, Cambridge (GB); Arm Limited, Cambridge (GB)

(72) Inventors: Sharjeel Saeed, Cambridge (GB); Daren Croxford, Cambridge (GB); Graeme Leslie Ingram, Cambridge (GB)

(73) Assignee: Apical Limited and Arm Limited, Cambridge (GB)

( * ) Notice: Subject to any disclaimer, the term of this patent is extended or adjusted under 35 U.S.C. 154(b) by 36 days.

(21) Appl. No.: 16/447,728

(22) Filed: Jun. 20, 2019

(65) Prior Publication Data

US 2020/0401531 A1 Dec. 24, 2020

(51) Int. Cl.
*G06F 12/00* (2006.01)
*G06F 12/10* (2016.01)
*G06N 3/04* (2006.01)

(52) U.S. Cl.
CPC .............. *G06F 12/10* (2013.01); *G06N 3/04* (2013.01); *G06F 2212/657* (2013.01)

(58) Field of Classification Search
CPC .. G06F 12/10; G06F 12/0862; G06F 12/0875; G06F 12/0292; G06F 2212/602; G06F 2212/657; G06F 2212/1024; G06F 2212/6022; G06F 2212/6024; G06F 2212/6026; G06F 2212/6028; G06F 2212/68; G06N 3/04; G06N 3/08; G06N 20/00
See application file for complete search history.

(56) References Cited

U.S. PATENT DOCUMENTS

2018/0342061 A1* 11/2018 Xiang .................... G06N 5/046
2019/0370632 A1* 12/2019 Hashemi ................ G06N 3/063

* cited by examiner

*Primary Examiner* — Shawn X Gu
(74) *Attorney, Agent, or Firm* — EIP US LLP (57) ABSTRACT

A method for managing memory access for implementing at least one layer of a convolutional neural network is provided. The method comprises predicting an access procedure in relation to a portion of memory based on a characteristic of the convolutional neural network. In response to the prediction, the method comprises performing an operation to obtain and store a memory address translation, corresponding to the portion of memory, in storage in advance of the predicted access procedure. An apparatus is provided comprising at least one processor and storage. The apparatus is configured to predict an access procedure in relation to a portion of memory which is external to the processor. In response to the prediction, the apparatus is configured to obtain and store a memory address translation corresponding to the portion of memory in storage in advance of the predicted access procedure.

18 Claims, 8 Drawing Sheets

MANAGING MEMORY ACCESS FOR CONVOLUTIONAL NEURAL NETWORKS

BACKGROUND

Technical Field

The present disclosure relates to methods and apparatus for managing data processing.

Background

Processors used to implement convolutional neural networks, such as neural processing units (NPUs), central processing units (CPUs), graphical processing units (GPUs), digital signal processors (DSPs), and coprocessors, have on board memory, usually in the form of static random-access memory (SRAM). When implementing convolutional neural networks using such processors, it may not be possible for all of the data including, for example, the input data, the output data, and data corresponding to the operations involved in the convolutional neural network, to be maintained on the processors memory. At least some of the data may be stored in memory which is external to the processor, this may include both volatile and non-volatile memory. The processor may access the external memory when executing the convolutional neural network. Processors may have associated storage, for example a cache, also known as a translation lookaside buffer, which stores memory address translations corresponding to locations in memory. The memory address translations are used to convert from memory addresses used by the processor to memory addresses identifying portions of memory where the associated data is stored. Using virtual memory may allow scattered physical memory locations to appear as contiguous. They may also allow processes which operate on the same virtual address to access separate versions of the data stored in separate portions of physical memory. The storage may not be able to store memory address translations for all memory address locations due to size restrictions. Size restrictions may be imposed by desired properties, for example, a desired access speed, area, or cost. Where a memory location is to be accessed and the associated memory address translation is not stored in the storage, the memory address translation is fetched so that the memory location can be accessed. Fetching may include accessing a secondary, larger storage, for example a larger cache, or may involve accessing a master page table comprising memory address translations for a larger system.

It is desirable to increase the efficiency of memory access when implementing convolutional neural networks.

SUMMARY

According to a first aspect of the present disclosure, there is provided a method for managing memory access for implementing at least one layer of a convolutional neural network on input data to generate output data using a processor, the method comprising at least: predicting an access procedure in relation to a portion of memory which is external to the processor based on at least one or more characteristics of the convolutional neural network; and in response to the predicting, performing an operation to obtain a memory address translation corresponding to the portion of memory and to store the memory address translation in storage in advance of the predicted access procedure.

According to a second aspect of the present disclosure, there is provided a non-transitory computer-readable storage medium comprising instructions that, when executed by a processor, cause the processor at least to: predict an access procedure in relation to a portion of memory which is external to a processor for implementing at least one layer of a convolutional neural network on input data to generate output data based on at least one or more characteristics of the convolutional neural network; and in response to the predicting, perform an operation to obtain a memory address translation corresponding to the portion of memory and to store the memory address translation in storage in advance of the predicted access procedure.

According to a third aspect of the present disclosure, there is provided apparatus comprising: at least one processor for implementing at least one layer of a convolutional neural network on input data to generate output data; and storage for storing a plurality of memory address translations, wherein the apparatus is configured to: predict an access procedure in relation to a portion of memory which is external to the at least one processor based on at least one or more characteristics of the convolutional neural network; and in response to the predicting, perform an operation to obtain a memory address translation corresponding to the portion of memory and to store the memory address translation in the storage in advance of the predicted access procedure.

BRIEF DESCRIPTION OF THE DRAWINGS

Further features and advantages will become apparent from the following description of preferred embodiments, given by way of example only, which is made with reference to the accompanying drawings in which like reference numerals are used to denote like features.

DETAILED DESCRIPTION

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further notes that certain examples are described schematically with certain features omitted and/or necessarily simplified for the ease of explanation and understanding of the concepts underlying the examples.

Certain examples described herein provide a method for storing a memory address translation corresponding to a portion of memory which is to be subsequently accessed in storage before a processor accesses the portion of memory when implementing at least one layer of a convolutional neural network. Memory access patterns may be determined based on one or more characteristics of the convolutional neural network which is implemented by the processor. In some cases, portions of memory which are accessed sequentially may be scattered in memory and so time may be wasted in determining the addresses of these portions of memory before they can be accessed. Predicting that a portion of memory is to be accessed and fetching a memory address translation corresponding to that portion of memory prior to the portion of memory being accessed may prevent a read or write operation from being delayed or stalled to determine the address of the relevant portion of memory. It is not desirable to delay, or stall, read or write operations as this may reduce processing throughput, which consequently reduces processing efficiency and wastes power. Predicting may also refer to a process of determining, for example determining based on at least one characteristic of the convolutional neural network. Implementing at least one layer of a convolutional neural network may include both training phases, where the convolutional neural network is trained on sample data, and inference phases where the convolutional neural network is used to process data and to make inferences. The examples described herein may be of particular benefit when the convolutional neural network reads or writes data out of order compared to the way in which said data is stored. In such a case, frequent scattered memory accesses are performed.

When implementing at least one layer of a convolutional neural network memory access may be performed for a variety of data. Examples described herein may be applicable to accessing portions of memory when reading and/or writing input data, output data, data relating to the convolutional neural network such as data representing weights of kernels in at least one layer of the convolutional neural network, and/or bias data. Input data may relate to data input to a first layer of the convolutional neural network and data which is input to each subsequent layer of the convolutional neural network. Input data may include sensor data derived from one or more sensors such as image sensors, sound sensors, and other suitable forms of sensor data as described below. Input data may also include input feature maps, generated from performing operations on sensor data. In some examples, data input to a first layer of a convolutional neural network may be sensor data and data input to subsequent layers of the convolutional neural network may be referred to as input feature maps. Output data may relate to data output from a last layer of the convolutional neural network and data which is output when performing convolutions at each intermediate layer. Data which is output when implementing a convolutional layer on an input feature map or input data from a sensor may be referred to as one or more output feature maps. The data may be compressed or uncompressed.

Certain examples described herein determine when it is appropriate to obtain and store a memory address translation which is to be subsequently accessed based on a size of the storage which is used to store the memory address translations. Further, memory address translations may be removed from the storage. In this case the determining when it is appropriate to obtain and store a memory address translation in the storage may be based on a retention and/or eviction policy of memory address translations in the storage. In some implementations there may be a high level of precision with regards to storing only the most relevant memory address translations in the storage. This may allow the reduction of the size of the storage which may in turn reduce the time taken to find memory address translations in the storage. Memory may refer to both volatile and non-volatile memory types. Memory address translations may also be referred to as virtual memory address translation or simply virtual address translations.

Figure 1:
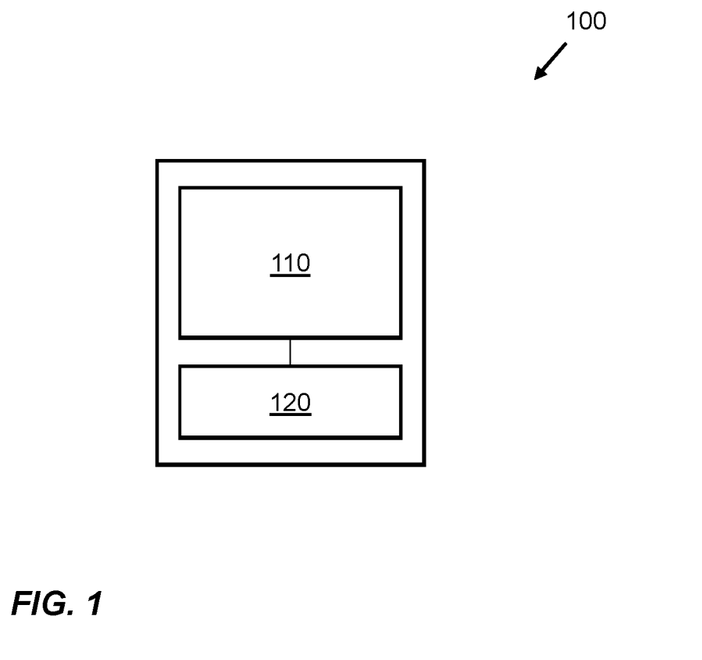
FIG. 1 is a schematic diagram illustrating apparatus according to an example.

FIG. 1 is a schematic diagram of apparatus 100 according to an example. The apparatus 100 may be comprised in a computing device. For example, the apparatus 100 may be part of a handheld computing device such as a smart telephone or tablet device. In such examples, the apparatus 100 may be used to implement a convolutional neural network, or at least one layer of a convolutional neural network, on data obtained by the smart telephone or tablet device. Data which can be obtained by a smart telephone or tablet device depends on the functionality of the device and sensors which are comprised in the device. This data may include image data, audio data, telemetry data, accelerometer data, global positioning system data, magnetometer data, light sensor data, fingerprint reader data, any other data which may be collected by a local sensor comprised in or on the computing device, or any data receivable over a local or wide area network through wired or wireless communication interfaces comprised in the computing device. Alternatively, the apparatus 100 may be used in another type of computing device, for example a computing device used in an autonomous vehicle, or in a robotics application where the convolutional neural network is used to process control data, sensory feedback data, or to provide any other suitable information processing.

The apparatus 100 comprises at least one processor 110, storage 120 for storing a plurality of memory address translations. Memory address translations may be translations between virtual memory addresses and physical memory addresses. For example, where virtual memory is being utilized. The memory addresses translations may correspond to either of volatile memory addresses or non-volatile memory addresses. Alternatively, the memory to which the memory translations relate may be separate from the at least one non-transitory computer-readable storage medium 130. In other examples, memory address translations may be translations between different virtual memory addresses. This may be the case where the convolutional neural network is being implemented using a virtual machine. The at least one processor 110 may include a neural processing unit (NPU) which may also be called an AI accelerator or a neural network processing unit. In other examples, the at least one processor 110 may include another form of processor which has been configured to implement at least on layer of a convolutional neural network. For example, the at least one processor 110 may include a CPU, a GPU, a DSP, a coprocessor, or any other suitable processor. The storage 120 may also be referred to as a cache or a translation lookaside buffer. The storage 120 may be part of a memory management unit (MMU) which handles memory address translations. In other examples the storage 120 may be separate from the MMU but may communicate therewith. In certain examples, the storage 120 is a dedicated translation lookaside buffer which serves the at least processor 110, providing memory address translations used by the processor 110 to carry out operations. The apparatus 100 may comprise, or may be part of a device which comprises, further processors and storages where the storage 120 serves the at least one processor 110 and not the further processors.

The apparatus is configured to predict an access procedure in relation to a portion of memory which is external to the at least one processor based on at least one or more characteristics of the convolutional neural network; and, in response to the predicting, perform an operation to obtain a memory address translation corresponding to the portion of memory and to store the memory address translation in the storage 120 in advance of the predicted access procedure. The portion of memory which is external to the at least one processor may be any suitable form of memory, including volatile memory such as RAM and non-volatile memory such as ROM. In some examples the apparatus 100 comprises the portion of memory. For example, the apparatus 100 may comprise memory for storing at least some of input data, output data, and data representing at least part of the convolutional neural network. In other examples, the apparatus 100 may be communicatively coupled to the memory for storing at least some of input data, output data, and data representing at least part of the convolutional neural network. The type of memory which is used may be determined by a plurality of factors including: where the input data is stored, the size of the input data which may determine whether it is able to be stored on volatile memory at the apparatus 100, where the output data is to be written out to, and where the data corresponding to the convolutional neural network is stored. The memory accesses which are performed by the processor 100 when implementing the at least one layer of the convolutional neural network may be deterministic but scattered in memory. By storing the memory address translation of a portion of memory which is to be subsequently accessed in the storage 120 in advance of the predicted access procedure relating to the portion of memory, the time taken to perform the predicted access procedure may be reduced. When the at least one processor 110 attempts to access a portion of memory, the translation lookaside buffer, or storage 120, is accessed to determine the address of the portion of memory. If the memory address translation of the portion of memory is not in the translation lookaside buffer 120, the processor 110 cannot directly access the portion of memory. Instead, the memory address translation is fetched, increasing the time taken for the processor to read data from and/or write data out to the portion of memory. Fetching the memory address translation may comprise accessing a further storage comprising memory address translations, or performing a page walk of a master page table comprising memory address translations for a system comprising the apparatus 100. Pre-fetching the memory address translation may increase the efficiency of the apparatus 100 when implementing the at least one layer convolutional neural network. When implementing convolutional neural networks, a large number of memory accesses may be performed and where these memory accesses are scattered throughout the memory, pre-fetching the memory address translations may increase the efficiency of the system.

Figure 2:
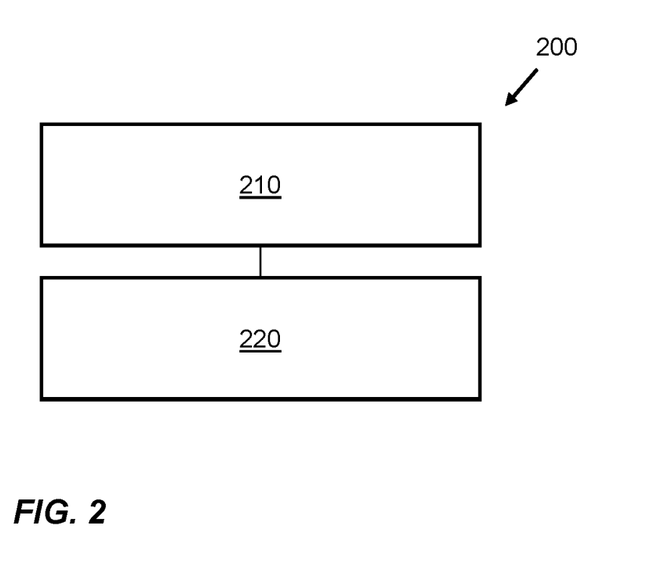
FIG. 2 is a flow diagram illustrating a method according to an example.

FIG. 2 is a flow chart of a method 200 for managing memory access for implementing at least one layer of a convolutional neural network on input data to generate output data using a processor. At block 210 the method comprises predicting an access procedure in relation to a portion of memory which is external to the processor based on at least one or more characteristics of the convolutional neural network. At block 220 the method comprises, in response to the predicting, performing an operation to obtain a memory address translation corresponding to the portion of memory and to store the memory address translation in storage in advance of the predicted access procedure. Obtaining and storing the memory address translation in the storage in advance of the predicted access procedure may reduce the time taken for a read and/or write operation, which uses the portion of memory, to be performed. Predicting the access procedure relating to the portion of memory based on at least one or more characteristics of the convolutional neural network is possible due to the deterministic nature of memory access when implementing convolutional neural networks. In examples where the portions of memory which are to be accessed when implementing the at least one layer of the convolutional neural network are scattered throughout the memory, pre-fetching the memory address translations for those portions of memory may be of particular benefit.

Figure 3:
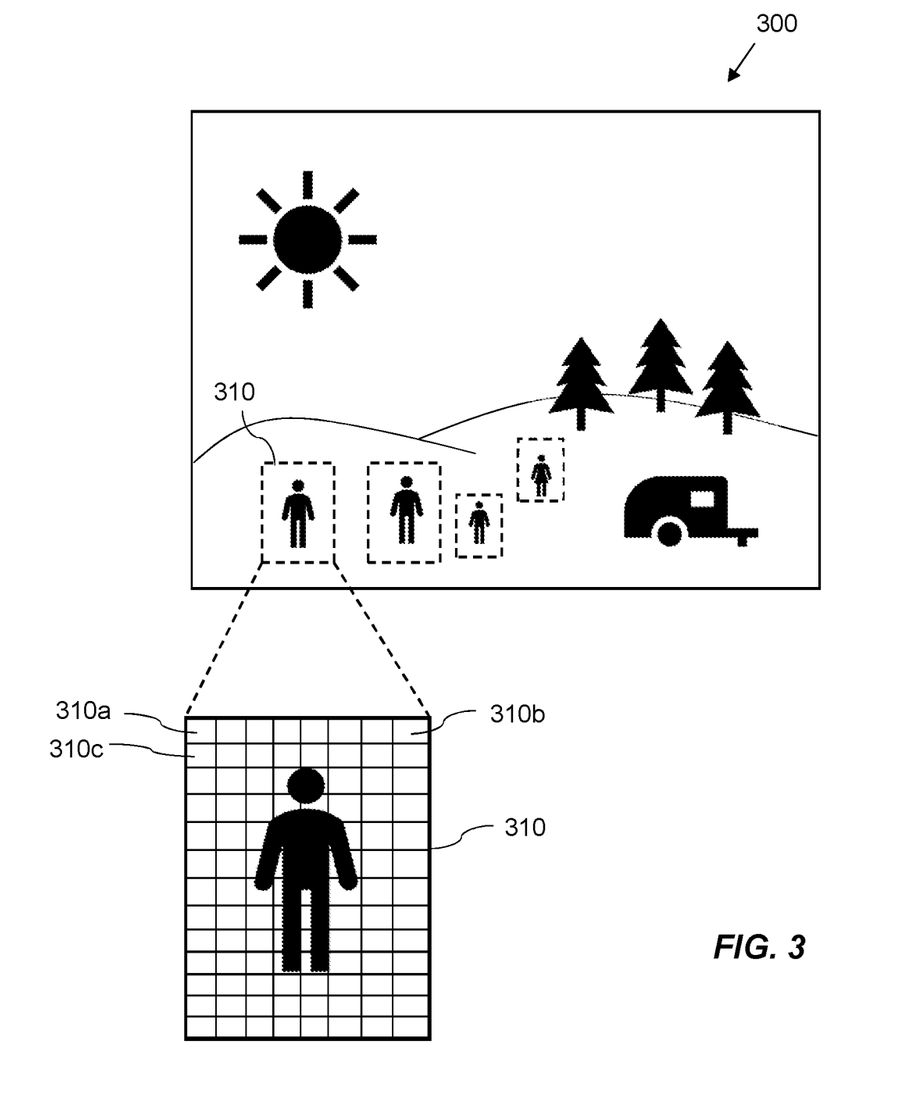
FIG. 3 is a schematic diagram of an image to be processed using a convolutional neural network according to an example.

A specific example of an application of the present disclosure will now be discussed in relation to FIG. 3. FIG. 3 shows schematically, an image 300 represented by image data. The image data may comprise a plurality of pixel intensity values representing a plurality of pixel locations. The pixel intensity values representing the image 300 may be stored in memory in contiguous blocks. For example, the pixel intensity value of each pixel location may be stored in memory contiguously with pixel intensity values representing horizontally adjacent pixel locations. Memory may comprise any suitable memory including random-access memory (RAM), read-only memory (ROM), video random-access memory (VRAM), synchronous dynamic random-access memory (SDRAM), or any other suitable type of memory.

In the example shown in FIG. 3, the image 300 has already been partially processed, for example, using a neural network, to detect objects in the image and classify them. The results of a detection of objects and classification of the objects are shown in FIG. 3 with broken boxes identifying the regions of the image in which people have been detected. These identified regions of the image may then be processed using a convolutional neural network to identify the people in the image. In this example, the convolutional neural network is to be implemented on the image data representing the identified regions to identify the people in those regions. When implementing the at least one layer of the convolutional neural network on the image data representing the region 310, a first portion of data representing a pixel location 310a may be accessed first and then portions of data representing the pixel locations along the same row may be accessed sequentially. Portions of data representing the horizontally adjacent pixel locations may be stored contiguously such that there is little processing involved in locating those portions of data representing the pixel locations between 310a and 310b. However, the portion of data representing the next line, starting at pixel location 310c may not be stored contiguously in physical memory with the portion of data representing pixel location 310b. Hence, a fetch operation may be performed to fetch the memory address translation corresponding to a portion of memory comprising data representing pixel location 310c. Predicting an access procedure relating to the portion of memory comprising the image data representing the pixel location 310c and obtaining and storing a memory address translation corresponding to that portion of memory in storage in advance of the predicted access procedure may prevent having to wait for the memory address translation to be determined before accessing the relevant portion of memory. In some examples, predicting an access procedure in relation to a portion of memory which is external to the processor is based on at least one characteristic of the input data. The convolutional neural network may be used to process a variety of different types of input data. Characteristics of the input data may also affect the access patterns and may be used in predicting an access procedure in relation to a portion of memory. In some examples, the at least one characteristic of the input data includes a storage configuration of the input data in memory which is external to the processor. That is to say, the characteristic of the input data may include how the input data is stored, such as whether the input data is stored contiguously, whether it is stored in a specific pattern, whether the input data is stored in blocks which are not contiguous with one another, and other conceivable arrangements. Other characteristics of the input data which may be used to predict an access procedure may include what type of data the input data is, and other conceivable characteristics which may be used to predict that the portion of memory is to be accessed. The method may also be used where the image data is stored according to a different rotation in which it will be used by the convolutional neural network. For example, where the image data is stored row major but is read column major for processing. This also applies to the output data, for example, where the output data is image data, and the output data is generated column major but stored row major.

Figure 4A:
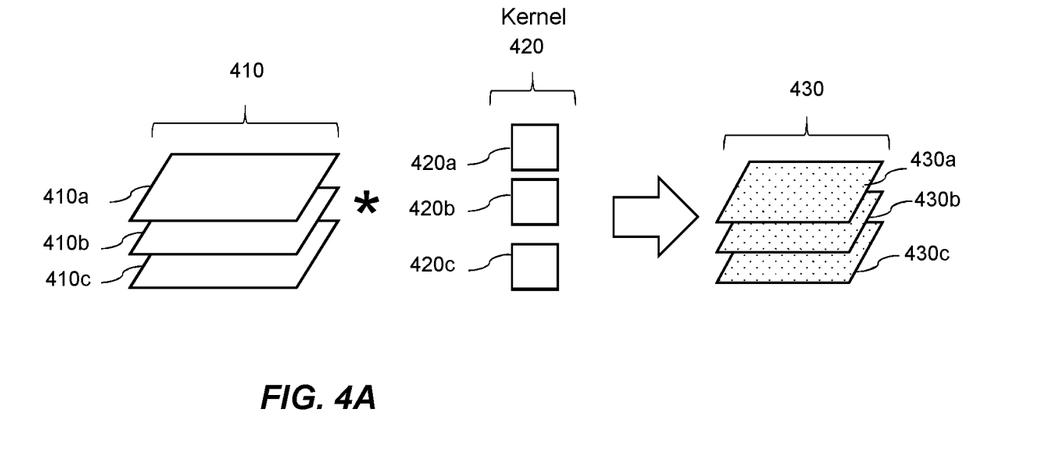
FIG. 4A is a schematic diagram illustrating an implementation of a simplified convolutional neural network, according to an example.

FIG. 4A is a schematic diagram illustrating an implementation of a layer of a simple convolutional neural network having a single feature map on input data to generate output data. The example shown in FIG. 4A will be discussed in relation to image data, however, it will be appreciated that the features described herein may also be applied to other data types, for example audio data.

FIG. 4A shows input data 410 comprising a plurality of parts 410a, 410b, 410c. For example, the input data 410 may be image data comprising a plurality of pixel intensity values representing a plurality of pixel locations. Each part, 410a-410c, may represent a different color channel. The input data 410a may comprise pixel intensity values corresponding to a green channel, input data 410b may comprise pixel intensity values corresponding to a red channel, and input data 410c may comprise pixel intensity values corresponding to a blue channel. The convolutional network may comprise a plurality of filters 420 representing a kernel. The kernel is used to identify a given type of feature in the input data 410. Each filter, 420a, 420b, 420c may correspond to a respective color channel and may be represented by a matrix. The filters 420 may be used to process the input data 410 to detect features in the image. When implementing the layer of the convolutional neural network, a convolution between the filter 420a is performed on a first portion of the part 410a of the input data 410, wherein a convolution is the process of adding each element of the input data 410a which overlaps with an element in the filter 420a to its local neighbors, weighted by the respective elements of the filter 420a. The filter is then shifted to a second portion of the input data 410a and the process is repeated. The increment with which the filter 420a is shifted may be referred to as the stride. Performing this process until the filter 420a has been applied to all of the input data 410a, according to its size and stride, will result in output data 430a. This process is performed for each color channel resulting in the output data 430 comprising a plurality of parts 430a, 430b, 430c, corresponding to respective color channels. In practice, the filters 420a, 420b, and 420c may be treated as a single kernel wherein the convolution is performed between the kernel and all of the layers of the input data at once. In this case the results across layers may be combined such that a single output feature map may be generated, i.e. an output feature map having a single part. The output data 430 may be further processed or modified.

Figure 4B:
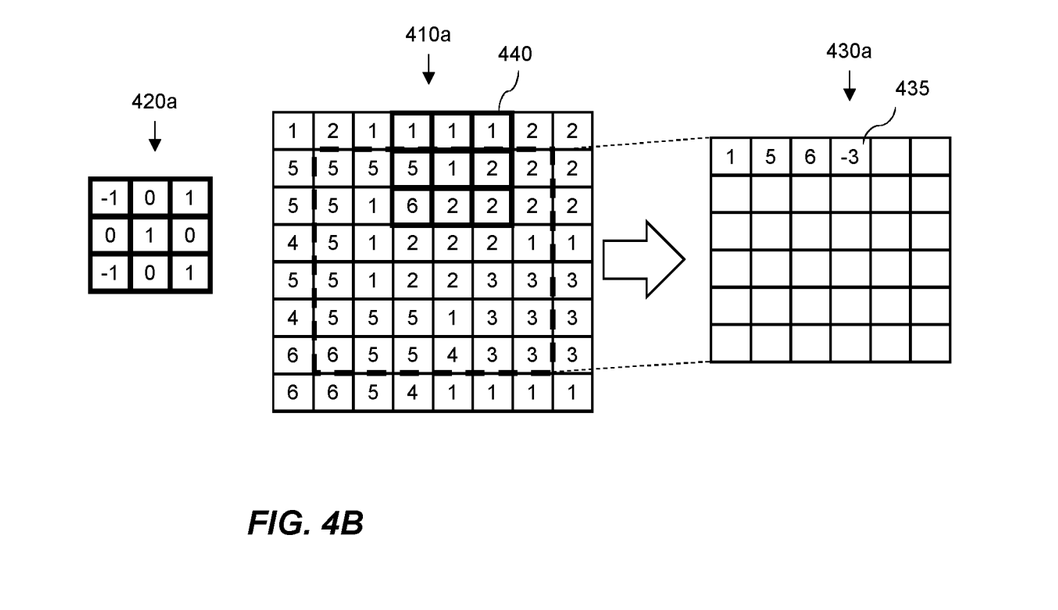
FIG. 4B is a schematic diagram illustrating a convolutional process, according to an example.

FIG. 4B shows schematically a convolution process in more detail. FIG. 4B shows a filter 420a which is applied to input data 410a. The filter 420a in FIG. 4B is being applied to the input data 410a with a stride of 1 such that the resulting output data 430a will have smaller dimensions than the input data 410a. In other examples, it may be possible to maintain the dimensions between the input data 410a and the output data 43a by applying padding to the input data 410a. The size of the output data 430a may also be reduced by pooling. At each position of the filter 420a, the values in the input data 410a which overlap with the filter will be summed according to the weights of the filter 420a. For example, at position 440 the output data which is generated by the convolution comprises a value −3 shown in the output data 430a at location 435. This value is determined by performing the following:

$[(-1)*1]+[(0)*1]+[(1)*1]+[(0)*5]+[(1)*1]+[(0)*2]+[(-1)*6]+[(0)*2]+[(1)*2]$.

The example discussed with reference to FIG. 4B shows only a single channel of the input data and the kernel being used. As discussed above, in practice, the filters 420a, 420b, and 420c may be used as a single kernel. In this case, the result of the above computation would be accumulated with similar computations for the other channels.

The operations performed on the input data when implementing the at least one layer of the convolutional neural network may affect the order in which portions of memory are accessed. In an example, implementing the at least one layer of the convolutional neural network comprises performing a plurality of operations on the input data, each operation is performed on at least part of the input data in a plurality of portions. Relating this to the example of FIG. 4, a part of the input data may relate to the part 410a. The plurality of operations may involve each convolution of the filter 420a with a portion of the input data 410a. The memory accesses which are performed to implement the at least one layer of the convolutional neural network in this case may be determined by the amount and/or order in which output data is generated and the amount and/or order in which input data is accessed. The memory accesses may also be determined by the amount and/or order in which kernels representing the convolutional neural network are accessed. The one or more characteristics of the convolutional neural network may comprise a size of at least one of the plurality of portions. The size of the portion of input data which is operated on by each operation may be dependent on the size of the filter 420a which is being used. In some examples, the portion of input data which is operated on by an operation may include a plurality of channels. In which case, the size of the portion of data which is operated on by each operation may be dependent on the size of a kernel, wherein the kernel comprises a corresponding plurality of filters. Accordingly, the one or more characteristics of the convolutional neural network may include a size, or dimensions, of at least one kernel used in the convolutional neural network. The size of the kernel 420 may affect the size of the output data 430. The one or more characteristics of the convolutional neural network may also include the stride of the kernel 420, or at least one of the filters in examples where they are being implemented separately, which is being used to implement the at least one layer of the convolutional neural network.

The one or more characteristics of the kernel may include which parts of the input data are comprised in each portion. This may be determined by a number of factors including, the overlap between successive operations, whether padding has been added, whether a bias has been used, the activation function, whether pooling is used, and other factors including the size of the portions.

In some examples, the one or more characteristics of the convolutional neural network comprise an order in which portions of the input data are to be accessed to implement the at least one layer of the convolutional neural network. The order in which portions of input data are accessed may be related to an order in which operations on the input data to generate output data are performed to implement the at least one layer of the convolutional neural network. Where the input data is too large to be stored in onboard storage in the processor the input data may be streamed when implementing the at least one layer of the convolutional neural network. That is to say, the input data may be segmented, and the at least one layer of the convolutional neural network may be implemented on the segmented portions separately with the results being stored in order, or combined, at the end. The order in which the portions of input data are to be accessed may be dependent on the way the input data is segmented. In one implementation the input data may be streamed in different channels, for example where the input data is image data, the image data may be split into a plurality of channels. In other implementations, the input data may be streamed in groups of channels. The example shown in FIG. 4A illustrates input data 410 split into three channels but in some applications the data may be split into more parts than this, for example sixty-four parts. In this example, streaming the input data may involve first operating on the first thirty-two parts and subsequently operating on the second thirty-two parts. In other implementations, the input data may be segmented into tiles. For example, where the input data represents an image, the image may be split into a plurality of parts which at least partially overlap. The convolutional neural network may be implemented on each of the plurality of parts separately and then combined at the end. In some examples, the convolutional neural network is to be implemented on input data which is stored as part of a larger data set.

In an example, the one or more characteristics of the convolutional neural network comprise an order in which data corresponding to the convolutional neural network is to be accessed.

In an example, the one or more characteristics of the convolutional neural network comprise an order in which portions of output data are generated when implementing the at least one layer of the convolutional neural network. When generating output data, or partial output data, according to the convolutional neural network, output data may be generated according to the convolutions which are performed between filters, or kernels, and input data. This output data may be stored according to a predetermined storage scheme in which different portions of output data are to be stored with other predetermined portions of output data. Predicting that the portions of memory for storing the output data are to be subsequently accessed may be determined based on an order in which the output data is generated.

Figure 5:
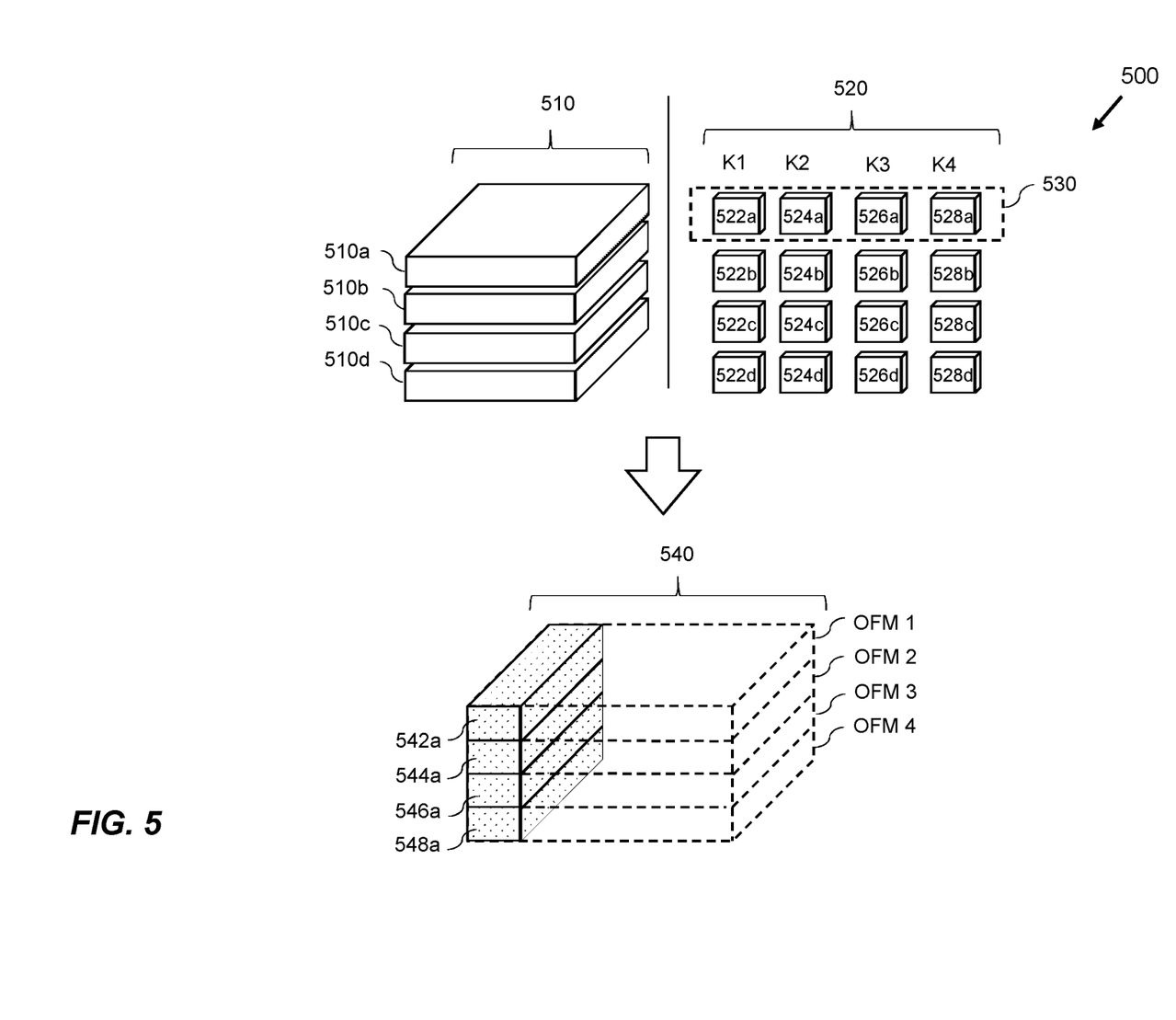
FIG. 5 is a schematic diagram of illustrating an implementation of a convolutional neural network according to an example.

FIG. 5 shows schematically an implementation of a convolutional neural network 500 comprising a plurality of feature maps in a first layer of the convolutional neural network. As discussed above, when implementing at least one layer of a convolutional neural network, it may not be possible to store all of the input data and data corresponding to the kernels in the memory on the processor. This may be overcome in a variety of ways, including input streaming, weight streaming, or a combination of the two. In examples where the input data cannot all be stored in the memory on the processor, the input data may be divided into multiple planes and may be fetched one-by-one, this may be called input streaming. FIG. 5 shows the input data 510, which is divided into multiple parts 510a, 510b, 510c, 510d to be sent to the processor sequentially. If it is not possible to store data corresponding to all of the kernels of the convolutional neural network in the memory on the processor then weight streaming may be used. Weight streaming is a process whereby data corresponding to the kernels, for example weights which make up the kernels, is sent to the processor in parts. In such an example, the one or more characteristics of the convolutional neural network may comprise an order in which portions of data representing at least part of the convolutional neural network are to be accessed to implement the at least one layer of the convolutional neural network. Data representing at least part of the convolutional neural network may include, weights, bias data, and other data representing the convolutional neural network. The kernels 520 are divided into parts and the parts are fetched one-by-one. FIG. 5 shows a set of kernels 520, representing feature maps, which are comprised in a first layer of the convolutional neural network. Each feature map is represented by a kernel which may be split into parts, for example feature map 1 is represented by a kernel K1 split into a plurality of parts 522a, 522b, 522c, 522d. Each feature map may be expressed as a single kernel, however, in the example shown in FIG. 5 the kernels are split into parts which correspond to the dimensions of divided input data. The part 522a of kernel K1 may be applied to the input data 500a, part 522b of kernel K2 may be applied to the input data 500b, part 522c of kernel K3 may be applied to the input data 500c, and part 522d of kernel K4 may be applied to the input data 500d. In the example shown in FIG. 5, the parts of the kernels K1 to K4 in the region 530 shown in broken lines may be a first set of the parts of the kernels which are fetched and used by the processor when weight streaming. Subsequently, the next set of the parts of the kernels which are fetched may be parts 522b, 524b, 524c, and 524d. Alternatively, the parts of the kernels may be fetched in a different order, for example, the parts 522a, 522b, 522c, and 522c may be the first set of the parts of the kernels which are fetched when weight streaming. The subsequent set of parts of the kernels may comprise 524a, 524b, 524c, and 524d. The weight streaming may proceed in this way until all the convolutions have been performed.

The output data generated by performing convolutions between kernels K1 to K4, representing corresponding feature maps, with the input data 510 may be used as the input to a further layer of the convolutional neural network. If weight streaming is used to implement the at least one layer of convolutional neural network, then the order in which data will be written out may be out of order when compared with the order in which it will be read in for the next layer of the convolutional neural network. This can be seen in FIG. 5, where the output data 540, generated by performing a convolution between the parts 522a, 524a, 526a, 528a and the input data, is shown below the input data 510 and the set of kernels 520. When using the output data 540 as input to the next convolutional layer it may be input streamed according to the planes shown in broken lines at 540. Consequently, it is desirable to store the data which is comprised in each plane contiguously. When a first portion of data 542a is generated it may be written to a first portion of memory. The first portion of memory may be a first part of a block of memory for storing the data corresponding to the horizontal plane OFM 1. An access procedure relating to a portion of memory for storing a second portion of data 544*a* is predicted and, in response to this prediction, an operation may be performed to obtain and store a memory address translation corresponding to a portion of memory at the start of a next block of memory for storing the data corresponding to the next horizontal plane OFM 2. This process may be repeated for the next two portions of output data 546*a* and 548*a*. The process is then repeated for the next set of parts of the kernels K1 to K4 which are weight streamed. The result of such an operation is that the portions of data 542*a*, 544*a*, 546*a*, 548*a*, are not stored contiguously with one another. Instead, they are stored in an order in memory which corresponds to an order in which they will be read when used as the input for a next layer of the convolutional neural network.

In an alternative arrangement, output data generated when performing convolutions between the kernels and the input data may be stored in the order in memory in the same order in which it is generated. In order to efficiently stream this data as the input to a further layer of the convolutional neural network, a memory access management scheme as described above may be used for the input. A first portion of memory may be accessed to read a first part of input data. An access procedure relating to a second portion of memory which is not contiguous with the first portion of memory may be predicted. In response to this prediction, an operation to obtain and store a memory address translation for the second portion of memory in the storage may be performed in advance of the predicted access procedure relating to the second portion of memory. This may allow the second portion of memory to be quickly accessed and the data therein read, without the added delay of waiting for the memory address translation to be obtained.

In an example, the operation to obtain and store the memory address translation corresponding to the portion of memory in the storage is a write operation, wherein the write operation is an empty write operation such that no data is written to the portion of memory. The empty write operation may also be referred to as a dummy write operation. The dummy write operation may be a write transfer in which all byte lane strobes are LOW such that no data is written to memory. The empty write operation may be performed by the processor, for example by a thread in the processor which is dedicated to performing empty write operations to populate the storage with memory address translations. Empty write operations may be used due to their interoperability with contemporary memory management units. Using an empty write operation may prevent the need for reconfiguring other hardware and/or software to be compatible with the memory access management scheme described herein. An empty write operation may be used regardless of the type of access procedure which is predicted. For example, if the predicted access procedure is a read procedure to read data stored in a corresponding portion of memory, or whether the predicted access procedure is a write procedure to write data into the portion of memory when implementing the at least one layer of the convolutional neural network, an empty write operation may be used regardless.

In other examples, the operation to obtain and store the memory address translation corresponding to the portion of memory in the storage is a read operation to read the portion of memory. Performing a read operation may be performed by the processor. The processor may implement a thread which performs read operations of portions of memory which are to be subsequently accessed when implementing the at least one layer convolutional neural network. Where the predicted access procedure is a write procedure to write data to a corresponding portion of memory, the read operation, to obtain and store the memory address translation in storage, may be performed at any suitable time before the portion of memory is to be accessed. Where the portion of memory stores data, for example input data, which will be used by the convolutional neural network, the read operation may be timed such that a command is sent at a time such that the data stored in the portion of memory is received by the processor at the time at which it is to be used to implement the at least one layer of the convolutional neural network.

In some implementations, the operation to obtain and store the memory address translation corresponding to the portion of memory in the storage is a custom operation for obtaining and storing the memory address translation in the storage. Using a custom operation for obtaining and storing a memory address translation may allow the operation to forgo surplus communications protocols and consequently increase the efficiency of the operation. An example of a custom operation for obtaining and storing a memory address translation includes the "StashTranslation" transaction provided in the Advanced Microcontroller Bus Architecture (AMBA) 5 Specification—"AMBA AXI and ACE Protocol Specification (AXI3, AMI4, AXI5, ACE and ACE 5)"—ARM IHI 0022F. b (ID122117) published in 2017. The StashTranslation transaction, as discussed in the above referenced document, may be used to indicate to a memory management unit that a translation is to be obtained for an address supplied with the transaction. The StashTranslation transaction has no associated data transfers. The address and control information are provided on the address write (AW) channel. A single response is provided on the write response (BRESP) channel. The response is provided after the address has been accepted. In other cases, different custom operations may be used. In some examples, the custom operation may be capable of performing other functions as well.

In some implementations, the method comprises removing the memory address translation from the storage in dependence on at least one of a prediction of a further access procedure in relation to the portion of memory, and a prediction of a duration for performing a further operation to obtain and store the memory address translation in storage. In some cases, memory address translations may be removed from the storage in order to free up space for further memory address translations and to keep the storage from becoming too large. A memory address translation may not be removed from the storage if it is determined that the corresponding portion of memory is to be subsequently accessed soon. For example, where the portion of memory is to be accessed soon and the time taken to perform the operation to obtain and store the corresponding memory address translation in storage is longer than the time until the next access procedure, the memory address translation may not be removed from memory. If, however, it is determined that the portion of memory is not be accessed for a considerable time, then its corresponding memory address translation may be removed from memory temporarily.

Figure 6:
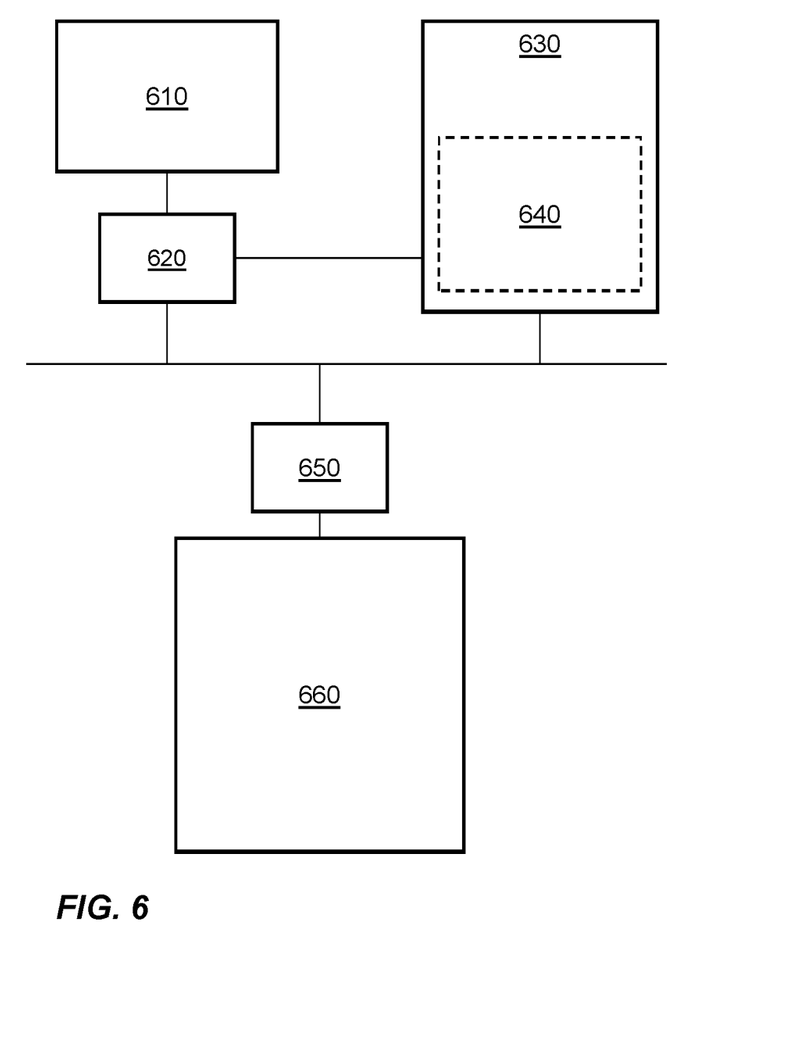
FIG. 6 is a schematic diagram of a system comprising features according to examples.

FIG. 6 is a simplified schematic diagram of an implementation of a system 600 illustrating features of the present disclosure. FIG. 6 shows a processor 610 for implementing at least a layer of a convolutional neural network. The processor 610 is communicatively coupled to storage 620 for storing memory address translations. The storage 620 shown in FIG. 6 is a micro translation lookaside buffer which stores memory address translations for use by the processor 610 at least when implementing the at least one layer of the convolutional neural network. A system memory management unit 630 is shown which comprises further storage 640, for example a translation lookaside buffer. The storage 640 may be larger than the storage 620 and may store a larger number of memory address translations. For example, the storage 640 may store memory address translations corresponding to those used by a plurality of processors and/or processes. That is to say the system memory management unit may serve a plurality of processors. Using a first, smaller, storage 620 for the processor may allow quicker determination of the memory address translations as the number of entries in the storage 620 which may be scanned to find a memory address translation are fewer than in the larger storage 640. A memory access controller 650 is provided which is connected to memory 660. In an example the processor may attempt to access a portion of memory to implement at least one layer of a convolutional neural network. The micro translation lookaside buffer 620 is accessed to find a memory address translation corresponding to the portion of memory. If the micro translation lookaside buffer 620 does not comprise the relevant memory address translation, the translation lookaside buffer 640 may be scanned to determine the relevant memory address translation. If the translation lookaside buffer 640 does not comprise the relevant memory address translation, then a page table walk is performed on a master page table comprising memory address translations for the system 600, for example at the memory 660. This process increases the time taken to determine the relevant memory address translation. It is desirable to ensure that relevant memory address translations are stored in the micro translation lookaside buffer 620 before they are needed by the processor 610 to implement the at least one layer of the convolutional neural network.

Figure 7:
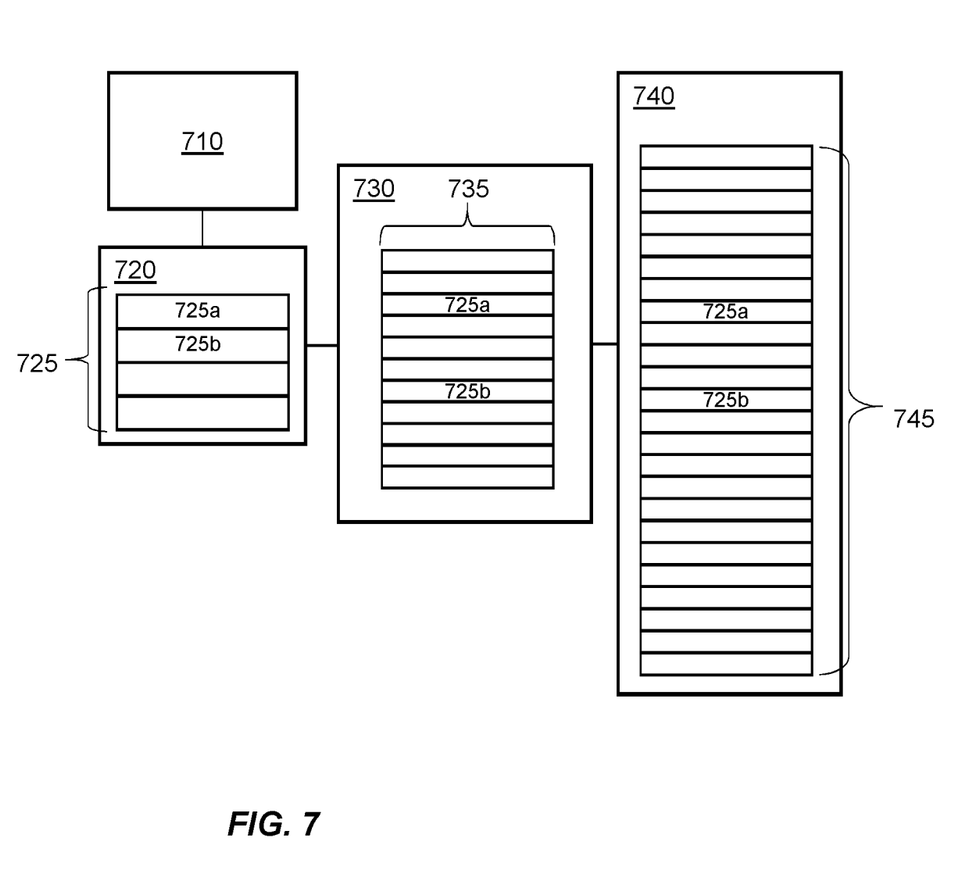
FIG. 7 is schematic diagram of a system comprising features according to examples.

FIG. 7 shows schematically a processor 710, storage 720 comprising a first plurality of memory address translations 725, a memory management unit 730 comprising a second plurality of memory address translations 735 and a master page-table 740 comprising a third plurality of memory address translation 745. In an example, the portion of memory is a first portion of memory, the memory address translation 725*a*, is a first memory address translation, and the method comprises performing the predicted access procedure relating to the first portion of memory. The method also comprises predicting a further access procedure in relation to a second portion of memory which is external to the processor 710 based on at least one or more characteristics of the convolutional neural network. In response to the performing the predicted access procedure relating to the first portion of memory the method comprises, performing an operation to obtain a second memory address translation 725*b* corresponding to the second portion of memory and to store the second memory address translation 725*b* in the storage in advance of the predicted further access procedure relating to the second portion of memory. The second memory address translation may be retrieved from either of the second and third plurality of memory address translations 735, 745 as shown in the example of FIG. 7. Obtaining and storing the second memory address translation 725*b* in response to the predicted access procedure relating to the first portion of memory may prevent the memory address translation 725*b* from being stored long before it is needed and may also allow the second memory address translation 725*b* to be stored in the storage 720 before it is needed.

The storage 720 may be of a fixed size and so entries in the storage 720 may be removed to make space for future memory address translations which are to be used. In an example, after performing the predicted further access procedure relating to the second portion of memory the method comprises removing the first memory address translation from the storage 720. As the second portion of memory is accessed after the first portion of memory, accessing the second portion of memory may be used as an indicator that it is acceptable to remove the first memory address translation. In this way, space in the storage may be freed up for further operations to obtain and store memory address translations therein. Rather than separately deleting and writing data into the storage 720, entries may be overwritten as new entries are generated. Removing the first memory address translation from the storage may comprise overwriting the first memory address translation with a third memory address translation corresponding to a third portion of memory which is external to the processor and which is to be subsequently accessed.

In an implementation of the present disclosure, the method may comprise determining when to perform the operation to obtain the memory address translation and to store the memory address translation in the storage based on at least a size of the storage. The size of the storage may determine the number of memory address translations which can be stored therein. The number of entries which may fit in the storage may depend on the size of the storage and the size of the pages which are used to store memory address translations. In some examples, the number of memory address translations, which may be called entries, which can be stored in the storage may be known. In other examples, the maximum number of entries in the storage may be determined by performing a batch of accesses which utilize the memory address translations stored in the storage. By timing the access time for each of the batch of accesses, it may be possible to determine the total number of entries in the storage. Memory address translations should not be removed or overwritten in the storage until they have been used to access their respective portions of memory. The operation to obtain and store the memory address translation may be performed based on the determination of when to perform the operation to obtain the memory address translations and store the memory address translation in the storage. This may allow the memory address translation to be stored in the storage at an appropriate time such that it is able to be stored in the storage without evicting another memory address translation which is to be used earlier than that memory address translation. Determining when to perform the operation to obtain and store the memory address translation in the storage may also be based on a rate at which memory address translations stored in the storage are removed from the storage. Memory address translations may be removed from the storage when it is appropriate to do so. The method may involve predicting when there will be available space to store the memory address translation in the storage and performing the operation at that time. In some examples, a memory address translation may also be maintained in the storage after the corresponding portion of memory has been subsequently accessed if it is expected to be accessed again soon.

The examples described herein may also be used where the input data and/or the output data are compressed. Some methods of compression of data are deterministic and hence can be factored into a prediction of an access procedure. In such cases the memory address translations which are obtained and stored may correspond to the starting address of compressed blocks which are to be read or written out.

Figure 8:
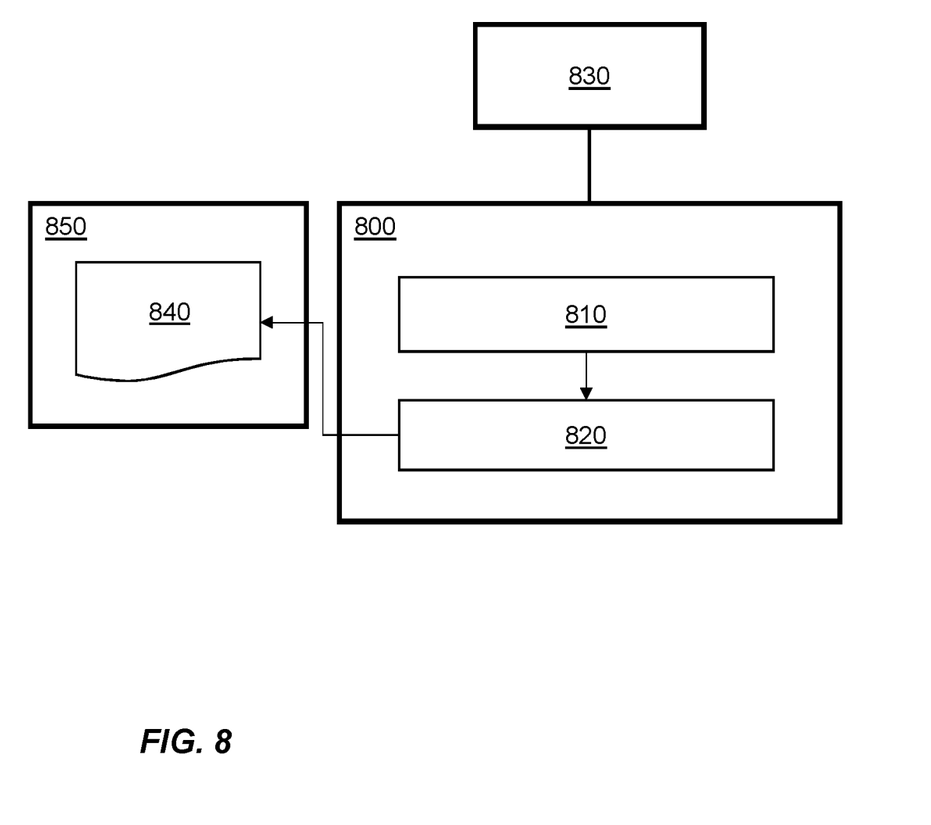
FIG. 8 is a schematic diagram of a non-transitory computer-readable storage medium according to an example.

FIG. 8 shows a non-transitory computer-readable storage medium 800 according to an example. The non-transitory computer-readable storage medium 800 comprises computer-readable instructions shown in blocks 810 and 820. The instructions at block 810 when executed by a processor 830, cause the processor 830 at least to, predict an access procedure in relation to a portion of memory which is external to a processor for implementing at least one layer of a convolutional neural network on input data to generate output data based on at least one or more characteristics of the convolutional neural network. The processor which implements the at least one layer of the convolutional neural network may be the processor 800. Alternatively, the processor which implements the at least one layer of the convolutional neural network may be a different processor to the processor 830. For example, processor 830 may be a processor used to manage the memory address translations. The instructions at block 830, when executed by the processor 830, cause the processor at least to, in response to the predicting, perform an operation to obtain a memory address translation 840 corresponding to the portion of memory and to store the memory address translation in storage 850 in advance of the predicted access procedure. This may be the case where, for example, the processor is any of a CPU, a GPU, or a DSP. Alternatively, where the processor is an NPU, predicting that a portion of memory is to be accessed may be performed by a state-machine.

The above examples are to be understood as illustrative examples of the present disclosure. Further examples are envisaged. For example, the memory address translations may be address translations between virtual memory addresses and further virtual memory addresses. This may be the case where, for example, the convolutional neural network is being implemented on one or more virtual machines. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A method for managing memory access for implementing at least one layer of a convolutional neural network on input data to generate output data using a processor, the method comprising:
   predicting an access procedure in relation to a portion of memory which is external to the processor based on at least one or more characteristics of the convolutional neural network; and
   in response to the predicting, performing an operation to obtain a memory address translation corresponding to the portion of memory and to store the memory address translation in storage in advance of the predicted access procedure,
   wherein the one or more characteristics of the convolutional neural network comprise an order in which portions of the input data are to be accessed to implement the at least one layer of the convolutional neural network.

2. The method of claim 1, wherein the one or more characteristics of the convolutional neural network comprise an order in which portions of data representing at least part of the convolutional neural network are to be accessed to implement the at least one layer of the convolutional neural network.

3. The method of claim 1, wherein the one or more characteristics of the convolutional neural network comprise an order in which portions of the output data are generated when implementing the at least one layer of the convolutional neural network.

4. The method of claim 1, wherein implementing the at least one layer of the convolutional neural network comprises performing a plurality of operations on the input data and each operation is performed on at least part of the input data in a plurality of portions and the one or more characteristics of the convolutional neural network comprise a size of at least one of the plurality of portions.

5. The method of claim 1, wherein implementing the at least one layer convolutional neural network comprises performing a plurality of operations on the input data and each operation is performed on at least part of the input data in a plurality of portions and the one or more characteristics of the convolutional neural network includes which parts of the input data are comprised in each portion of the input data.

6. The method of claim 1, wherein predicting the access procedure in relation to the portion of memory which is external to the processor is based on at least one characteristic of the input data.

7. The method of claim 6, wherein the at least one characteristic of the input data includes a storage configuration of the input data in memory which is external to the processor.

8. The method of claim 1, wherein the operation to obtain and store the memory address translation corresponding to the portion of memory in the storage is a write operation, wherein the write operation is an empty write operation such that no data is written to the portion of memory.

9. The method of claim 1, wherein the operation to obtain and store the memory address translation corresponding to the portion of memory in the storage is a read operation to read the portion of memory.

10. The method of claim 1, wherein the operation to store the memory address translation corresponding to the portion of memory in the storage is a custom operation for obtaining and storing the memory address translation in the storage.

11. The method of claim 1, wherein the method comprises removing the memory address translation from the storage in dependence on at least one of:
   a prediction of a further access procedure in relation to the portion of memory; and
   a prediction of a duration for performing a further operation to obtain and store the memory address translation in storage.

12. The method of claim 1, wherein the portion of memory is a first portion of memory, the memory address translation is a first memory address translation, and the method comprises:
   performing the predicted access procedure relating to the first portion of memory;
   predicting a further access procedure in relation to a second portion of memory which is external to the processor based on at least one or more characteristics of the convolutional neural network; and
   in response to the performing the predicted access procedure relating to the first portion of memory, performing an operation to obtain a second memory address translation corresponding to the second portion of memory and to store the second memory address translation in the storage in advance of the predicted further access procedure relating to the second portion of memory.

13. The method of claim 12, wherein after performing the predicted further access procedure relating to the second portion of memory, the method comprises removing the first memory address translation from the storage.

14. The method of claim 13, wherein removing the first memory address translation from the storage comprises overwriting the first memory address translation with a third memory address translation corresponding to a third portion of memory which is external to the processor and which is to be subsequently accessed.

15. The method of claim 1, comprising determining when to perform the operation to obtain the memory address translation and to store the memory address translation in the storage based on at least a size of the storage, and wherein the operation to obtain and store the memory address translation is performed based on the determination of when to perform the operation to obtain the memory address translation and store the memory address translation in the storage.

16. The method of claim 15, wherein determining when to perform the operation to obtain the memory address translation and store the memory address translation in the storage is based on the size of the storage and a rate at which memory address translations stored in the storage are removed from the storage.

17. A non-transitory computer-readable storage medium comprising instructions that, when executed by a processor, cause the processor at least to:
   predict an access procedure in relation to a portion of memory which is external to a processor for implementing at least one layer of a convolutional neural network on input data to generate output data based on at least one or more characteristics of the convolutional neural network; and
   in response to the predicting, perform an operation to obtain a memory address translation corresponding to the portion of memory and to store the memory address translation in storage in advance of the predicted access procedure,
   wherein the one or more characteristics of the convolutional neural network comprise an order in which portions of the input data are to be accessed to implement the at least one layer of the convolutional neural network.

18. An apparatus comprising:
   at least one processor for implementing at least one layer of a convolutional neural network on input data to generate output data; and
   storage for storing a plurality of memory address translations,
   wherein the apparatus is configured to:
   predict an access procedure in relation to a portion of memory which is external to the at least one processor based on at least one or more characteristics of the convolutional neural network; and
   in response to the predicting, perform an operation to obtain a memory address translation corresponding to the portion of memory and to store the memory address translation in the storage in advance of the predicted access procedure,
   wherein the one or more characteristics of the convolutional neural network comprise an order in which portions of the input data are to be accessed to implement the at least one layer of the convolutional neural network.

* * * * *